United States Patent [19]
Couch et al.

[11] 3,775,763
[45] Nov. 27, 1973

[54] APPARATUS FOR INDICATING THE IMPENDING FAILURE OF A JET ENGINE

[75] Inventors: Robert P. Couch; Dennis R. Rossbach, both of Dayton, Ohio; Robert A. Vopalensky, Albuquerque, N. Mex.; Robert T. Fowler, K I Sawyer AFB, Mich.

[73] Assignee: The United States of America as represented by the Secretary of the United States Air Force, Washington, D.C.

[22] Filed: Mar. 7, 1972

[21] Appl. No.: 232,403

[52] U.S. Cl. .............................. 340/236, 340/237 S
[51] Int. Cl. ............................................. G08b 21/00
[58] Field of Search .................... 340/237 R, 237 S, 340/270, 236

[56] References Cited
UNITED STATES PATENTS
3,221,248   11/1965   Batteau ........................... 340/237 R
3,449,667   6/1969   Gourdine ........................ 340/237 R

*Primary Examiner*—Thomas B. Habecker
*Attorney*—Harry A. Herbert, Jr. et al.

[57] ABSTRACT

An apparatus, for indicating impending failure of jet engines, having an electrostatic probe in the exhaust of the jet engine with the probe signal being applied to a circuit for providing pulses, at the amplitude of a signal in a sample and hold circuit, for each positive going signal followed by a negative going signal. A pulse height discriminator provides uniform output pulses, for each pulse exceeding the integrated engine noise level, and applies its output to a smoothing circuit. When the signal level in the smoothing circuit exceeds a predetermined level, a trigger circuit is operated to energize a warning circuit.

3 Claims, 4 Drawing Figures

APPARATUS FOR INDICATING THE IMPENDING FAILURE OF A JET ENGINE

BACKGROUND OF THE INVENTION

There exists many types of test equipment for jet engines such as for measuring temperature, pressure, flame position and other engine conditions. However, most of these are used in engine control or in engine tests after failure occurs. Some system is needed which can identify engines that are in need of maintenance before engine failure occurs.

Electrostatic probes have been used for many years to study the properties of low pressure gas discharges and weakly ionized gases. More recently, electrostatic probes have been used to determine the electrical characteristics of a rocket exhaust plume.

BRIEF SUMMARY OF THE INVENTION

According to this invention, an electrostatic probe is used to indicate impending failure of jet engines.

Ion current obtained from an electrostatic probe in a jet engine exhaust under normal conditions contains noise, which relates to engine combustion or flow noise.

In the event of engine wear or the onset of failure conditions, a component of current may appear which is not normally found in any analysis of engine data.

Spallation, erosion or corrosion of metallic parts into the exhaust and the resultant appearance of metal in the exhaust can precipitate the formation of negative macro-ions and changed metal particles. Impact of such macro-ions and metal pieces on the probe causes spikes in the probe current. Since the probe noise correlates with engine acoustical noise, abnormal conditions can show up on the ion current data. Thus, if a pulse height discriminator is used with the clipping level set in relation to the average noise level, the spikes due to macro-ions and charged metal particles can be used to provide an indication of impending failure which is preceeded by small metal particles in the exhaust.

To provide a useable signal, a signal conditioning circuit is provided to produce uniform pulses with an amplitude corresponding to the amplitude of the pulses in the probe output signal. To provide pulses for even closely spaced pulses in the probe output signal, a logic circuit is provided in the signal conditioning circuit to provide an output pulse each time a positive going signal is followed by a negative going signal.

IN THE DRAWING

DETAILED DESCRIPTION OF THE INVENTION

Figure 1:
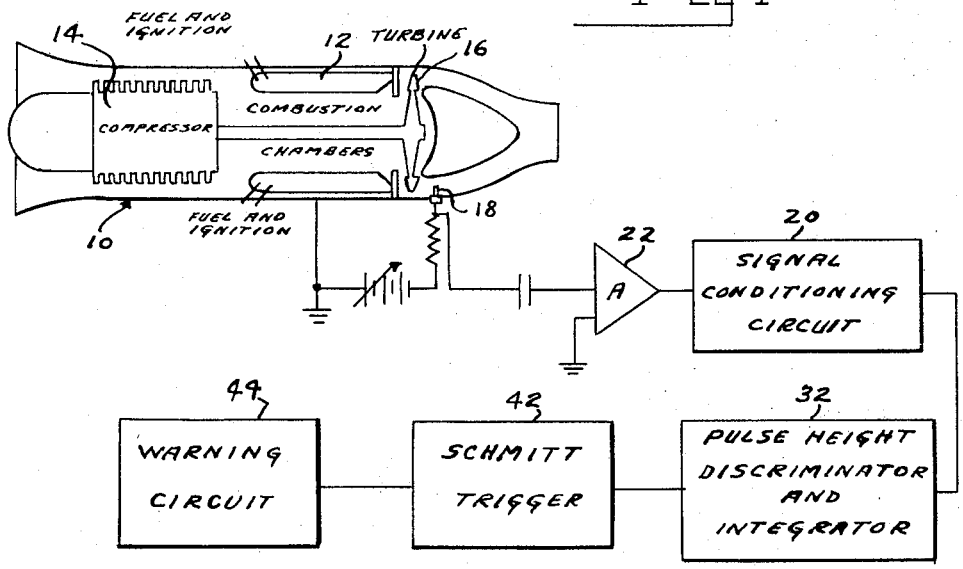
FIG. 1 is a schematic illustration partially in block form showing the test apparatus of the invention.
Figure 2:
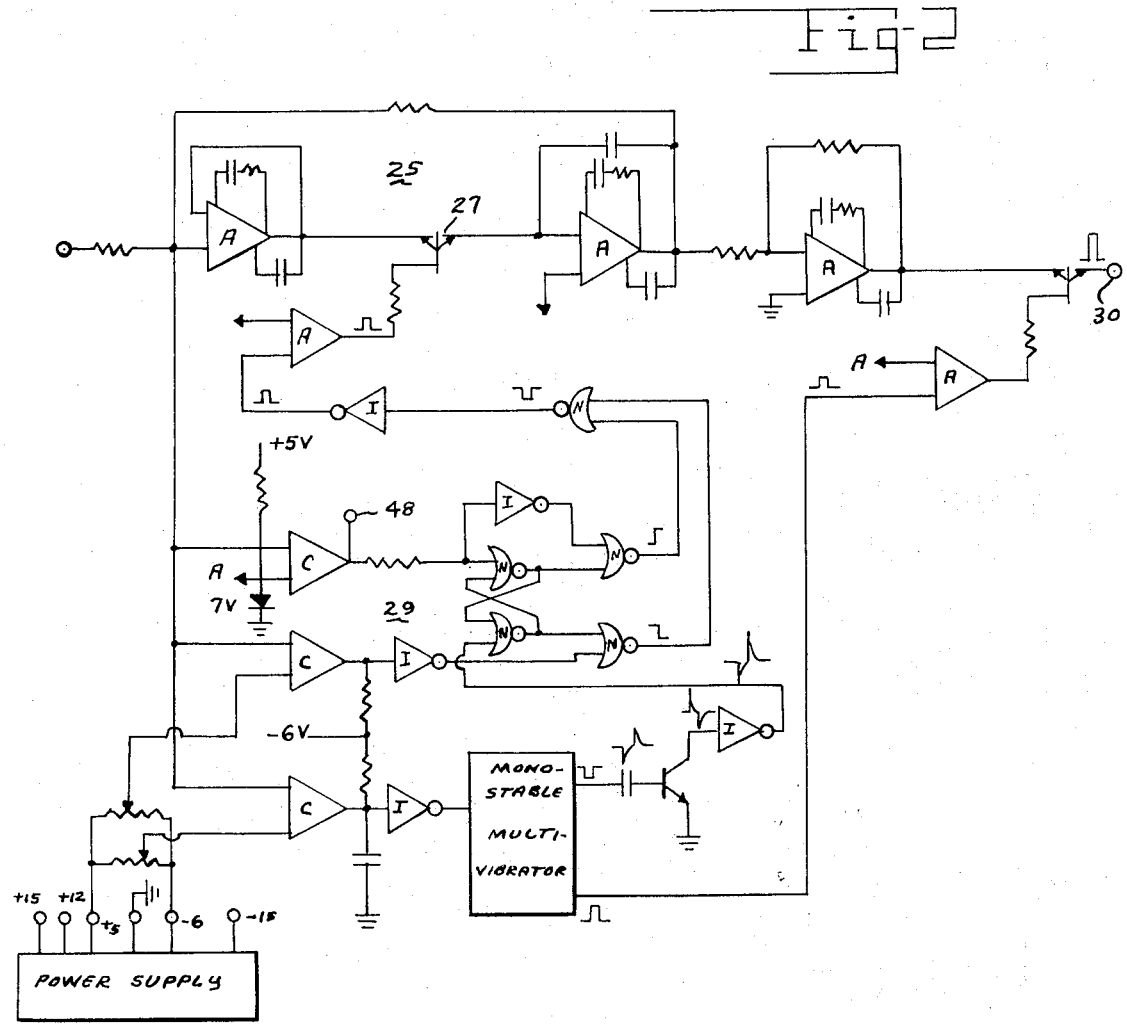
FIG. 2 is a schematic diagram partially in block form showing the signal conditioning circuit for the device of FIG. 1.

Reference is now made to FIG. 1 of the drawing wherein reference number 10 shows a conventional jet engine having a combustion chamber 12, a compressor 14, and a turbine 16. A probe 18 is positioned in the exhaust stream of the engine 10. While only one probe is shown, more than one may be used and in some cases a grid may be desirable. The probe output signal is applied to a signal conditioning circuit 20 through an amplifier 22. The signal conditioning circuit may be as shown in FIG. 2 and as described in detail in the copending application of Rossbach et al., "Signal Conditioning Circuit," Ser. No. 232,490 filed concurrently with this application.

Figure 4:
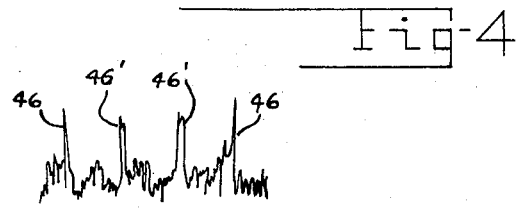
FIG. 4 shows one possible probe output signal for the device of FIG. 1.

The signal conditioning circuit, shown in FIG. 2, has a two stage feedback amplifier 25 which operates as a sample and hold circuit. The amplifier 25 has a bipolar switch 27 connected between the output of the first stage and the input of the second stage. A logic circuit 29 operates the switch 27 to step the sample and hold circuit and to provide an output pulse at 30 whenever the probe signal has a positive going signal followed by a negative going signal, such as when there are two closely spaced pulses as at 46' in FIG. 4. The output signal is at the amplitude of the signal in the sample and hold at the time the probe signal turns negative.

Figure 3:
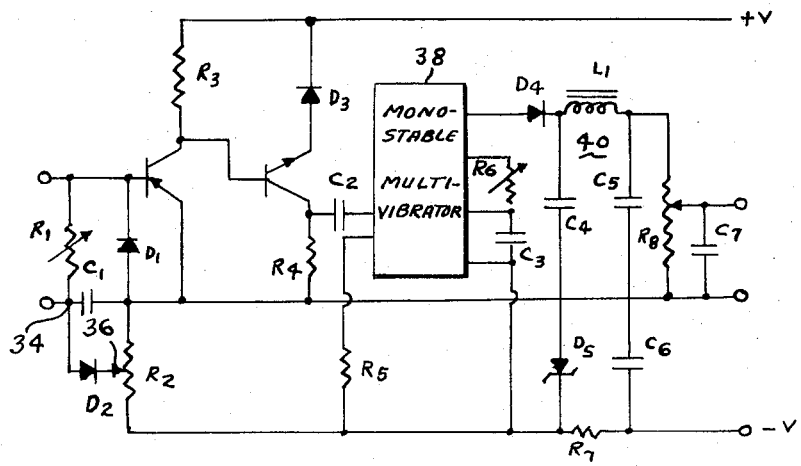
FIG. 3 is a schematic diagram partially in block form showing the pulse height discriminator and integrator for the device of FIG. 1.

The output of the signal conditioning circuit is supplied to pulse height discriminator and integrating circuit 32. This may be any circuit which will provide a uniform output pulse for each pulse that exceeds the average noise level by a predetermined amount, for example, as shown in FIG. 3.

The input signal is clamped to a floating reference point 34 with slider 36 providing the reference level for clipping. Any pulse that exceeds the floating reference voltage, as set by the reference clipping level and the average noise level, will trigger the monostable multivibrator 38 to produce a uniform output pulse which is supplied to the smoothing integrating circuit 40. When the signal in circuit 40 exceeds a predetermined level, it operates the Schmitt trigger 42 to energize warning circuit 44.

In the operation of the device, the probe 18 continuously produces an output signal which is related to engine combustion or flow noise. The threshold level in circuit 32 is set to substantially eliminate any signal output from monostable circuit 38. Any signals passing the circuit 38 will only raise the signal level circuit 40 to a point well below the level required to operate the trigger circuit 42. However, when erosion or corrosion of metallic parts results in the appearance of metal in the exhaust and produces spikes well above the noise level such as shown at 46 in FIG. 4, the output of circuit 38 increases the level in circuit 40 sufficiently to operate trigger 42 and produce a warning signal in 44. In one particular case, engine failure was predicted seven hours in advance of the occurrence.

While the output of circuit 32 has been described as being applied to a trigger and warning circuit, it could be applied to a recorder or other type device so that studies of engine failure may be made.

Also a pulse analyzer may be provided before or after the signal conditioning circuit for some applications. It has been found that spikes occur even when insulating particles hit the probe, but that the pulse rise time is different for insulating particles than for metal particles. Therefore, an output may be taken at 48 in FIG. 2, which will provide a pulse signal relating to the rate of change in the slope of the pulses. This may be supplied to a pulse counter or a frequency analyzer to determine what type of particles are hitting the probe.

The device of the invention is not for use in indicating all types of engine failure, but only those that occur in the engine itself by the corrosion, or erosion of metal or other particles into the exhaust.

While the device is described for use with jet engines, it may be used with other apparatus such as turbines and combustors.

There is thus provided an apparatus for providing an indication of engine condition and for indicating impending engine failure.

We claim:

1. An apparatus for analyzing the engine exhaust of a jet engine to indicate the presence of metal or other particles in the exhaust, comprising: an electrostatic probe positioned in the exhaust of the jet engine; means, responsive to the output signal of said probe for providing an indication of metal or other particles hitting the probe; said means, including means, for passing only pulse signals exceeding the average noise level of the probe signal by a predetermined amount; and means for indicating the presence of pulses, exceeding the average noise level of the probe signal by said predetermined amount, in the probe signal.

2. The device recited in claim 1, wherein the means, responsive to the output signal of said probe includes means for providing uniform width pulses at approximately the maximum positive signal level, for each positive going signal followed by a negative going signal; means, responsive to the last named means, for providing an output pulse for each pulse exceeding the average noise level in the probe output signal.

3. The device recited in claim 2, including an integrating circuit connected to the output of the output pulse means, and means responsive to the output of the integrating circuit for indicating when the signal level in the integrating circuit exceeds a predetermined value.

* * * * *